INTRUSION DETECTOR CONTROL FOR CLOSED CIRCUIT TELEVISION SYSTEM

Filed Sept. 29, 1966

INVENTOR.
CHARLES F. BURNEY

BY John F. Lawler
ATTORNEY

Jan. 6, 1970 C. F. BURNEY 3,488,436

INTRUSION DETECTOR CONTROL FOR CLOSED CIRCUIT TELEVISION SYSTEM

Filed Sept. 29, 1966 2 Sheets-Sheet 2

INVENTOR.

CHARLES F. BURNEY

BY John F. Lawler

ATTORNEY

United States Patent Office 3,488,436

Patented Jan. 6, 1970

3,488,436

INTRUSION DETECTOR CONTROL FOR CLOSED CIRCUIT TELEVISION SYSTEM

Charles F. Burney, Milpitas, Calif., assignor to Sylvania Electric Products Inc., a corporation of Delaware

Filed Sept. 29, 1966, Ser. No. 582,990
Int. Cl. H04n *3/00*
U.S. Cl. 178—6.8 7 Claims

ABSTRACT OF THE DISCLOSURE

A closed circuit television system is modified by an adapter control which continuously electronically compares respective halves of the picture signal from the camera and activates an alarm and/or turns on the TV monitor when one half changes relative to the other. The control is in the form of a pluggable unit connectable in the line between the camera and monitor and is readily switched into or out of the system to change the latter between automatic intrusion detection state and conventional monitoring.

This invention relates to a closed circuit television surveillance system of the type utilized to detect an optical change in the area of view of the camera and useful, for example, in providing such areas with security protection, or in the monitoring of any remote area or process where a change in the area or process represents a condition that should be brought to the attention of the observer.

It is highly desirable that closed circuit television apparatus feature an automatic response to a change in the scene picked up by the camera so as to eliminate the need of continuous viewing of the remote monitor by a guard or inspector. To this end, it has been proposed that the total video signal output of the camera be integrated and that alarm circuitry be activated when the integrated signal exceeds a predetermined threshold level. A system of this type is described in Patent No. 2,561,197. Since the total video output is measured, such a system requires that the threshold level be greater than the limits of system-induced output changes, such as changes in light intensity in the inspected area, variations in line voltage or in the range of amplifier tolerance, etc. In consequence, system sensitivity is reduced in order to prevent false alarms from such spurious signals. Also, video signal change can be negative as well as positive, as when the total light in the monitored scene decreases, and a threshold device that is responsive to a decreasing signal level is difficult to construct.

Another technique that has been proposed is comparison of camera tube images with a reference image to detect changes in the former. Such a system is described in Patent No. 2,955,155. However, any change in the background of the camera tube image necessitates the use of a new reference image, and slight changes in the position of the camera that would necessarily change the field of view, likewise require a different reference. Furthermore, changes of light intensity in the area being monitored are difficult to accommodate while maintaining a meaningful relationship between the monitored and projected images.

An object of this invention is the provision of a closed circuit television surveillance system in which the actual field of view of the camera at any instant is used to define normal and alarm conditions.

Another object is the provision of such a system which is responsive to relative optical changes in parts of the field of view but is insensitive to the total change in light reflected from the field of view occasioned by blinking lights, line voltage changes, and the like.

Another object is the provision of a closed circuit surveillance television system which is both a presence and an intrusion detector and which automatically signals an alarm condition so that the tedium of continual watching of the monitor screen is eliminated.

A further object is the provision of a simple inexpensive self-contained adapter unit which is pluggable into the line between the camera and monitor of a standard closed circuit television system to convert the latter into one which automatically detects a change in the monitored scene and gives an alarm signal.

Another object is the provision of such an intrusion detection system that has improved sensitivity without necessity of correspondingly expensive electrostatic or magnetic video storage components.

Yet another object is the provision of such an automatic system which is quickly and simply adapted to accommodate different fields of view.

These objects are accomplished by electronically dividing the video output of television camera into two parts for each horizontal sweep of the electron beam in the camera tube and comparing these two signal parts to determine whether there is a change in one relative to the other. Specifically, the camera tube picture is electronically divided into two halves by switching the video output for each half-sweep of the horizontally scanning beam between two circuits which are differentially compared. As long as one-half of the optical image on the camera tube remains unchanged relative to the other half, there is no output from the differential comparator and no alarm signal is generated. An optical change within the monitored area due, for example, to movement of an intruder therein or the shift in position of an object in the area, upsets the balance between the compared halves of the image on the camera pickup tube, and the difference signal generated by the comparator circuit is utilized to activate a visual or audio alarm and to cause the monitored scene to be displayed on the kinescope at the guard's station. If a different area is to be monitored, the system is readily calibrated for the new scene by adjustment of a potentiometer in the unit until a "no alarm" output is produced. Standard closed circuit television systems may readily be converted to include the features of this invention without physical modification of the equipment by simply adding a pluggable adapter to the line.

These and other objects of the invention will be better understood from the following description of a preferred embodiment thereof, reference being had to the accompanying drawings in which.

Figure 1:
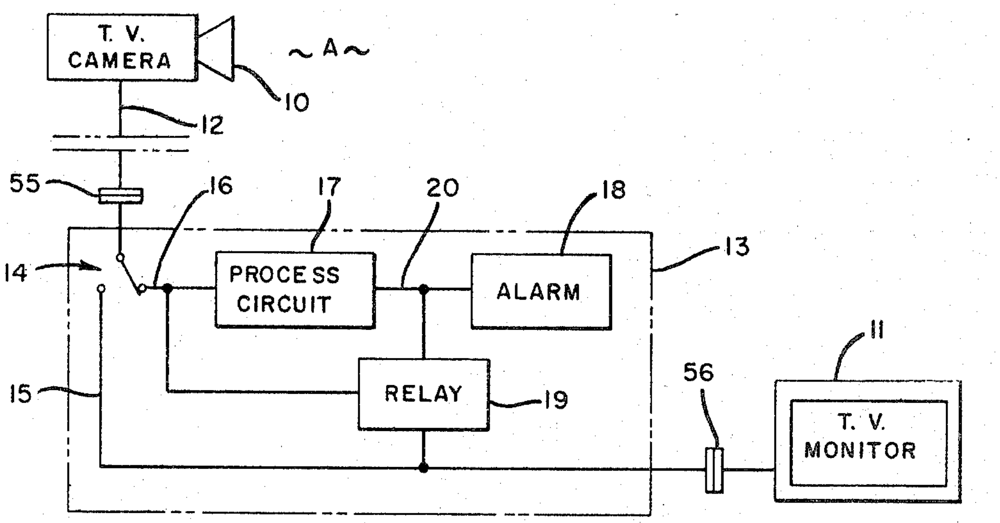
FIGURE 1 is a simplified block diagram of a closed circuit television system with an automatic alarm control unit according to this invention.

Referring now to the drawings, a preferred embodiment of the invention is illustrated in FIGURE 1 as a closed circuit television system having a television camera 10 at an area A under surveillance and connected to a remotely located receiver or monitor 11 by line 12 through an automatic alarm control unit 13. A switch 14 in the control unit in one position connects line 12 either directly to the monitor 11 via line 15, or in the other position indirectly to the monitor through line 16, process circuit 17, alarm device 18, and relay 19. When line 16 is connected by switch 14 to the output of camera 10, monitor 11 receives the video signal of the camera only when a change occurs in one part of the field of view of the camera relative to another part, such as results from the intrusion of a human or other visible object into the protected area. In other words, there is no image on the kinescope of the monitor during quiescent or "no alarm" conditions. When an alarm condition occures, alarm device 18, which may be a bell, flashing light, or the like, is activated and the image of the protected area is flashed on the monitor screen.

With switch 14 in the position shown, signal processing circuit 17 is responsive to the output of camera 10 to produce an output signal on line 20 whenever a change occurs in the right half of the field of view of the camera, for example, relative to the left half. The output signal from circuit 17 activates an alarm device 18 and energizes relay 19 so as to connect the camera output on line 16 directly to the monitor 11. Thus, the intrusion into the area A automatically warns the guard and displays the image of that area on the monitor.

Figure 3:
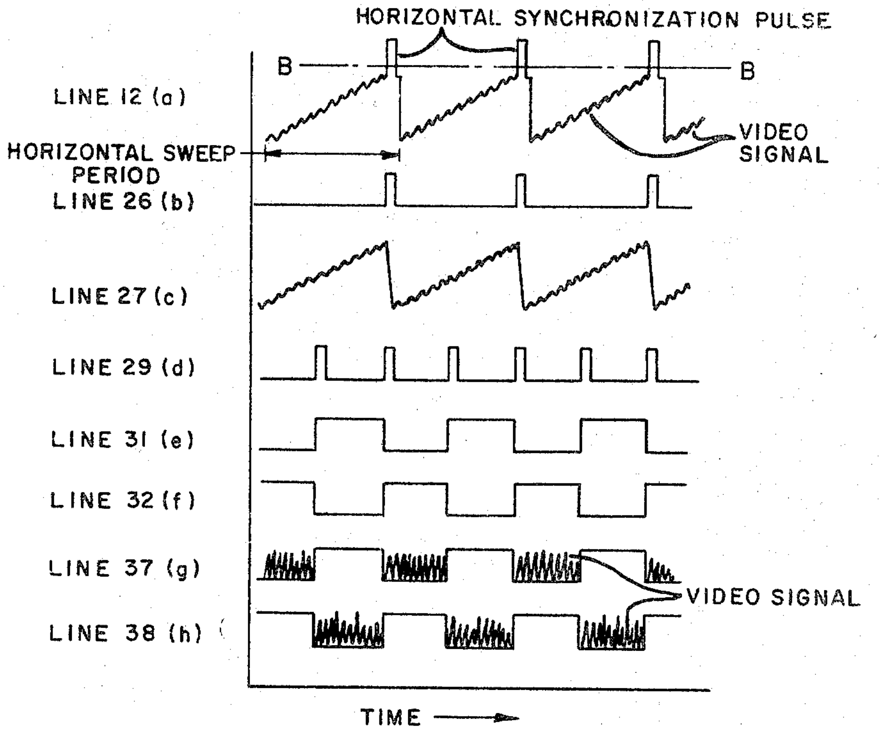
FIGURE 3 is a timing chart showing the pulses and waveforms produced at various parts of the circuit.
Figure 2:
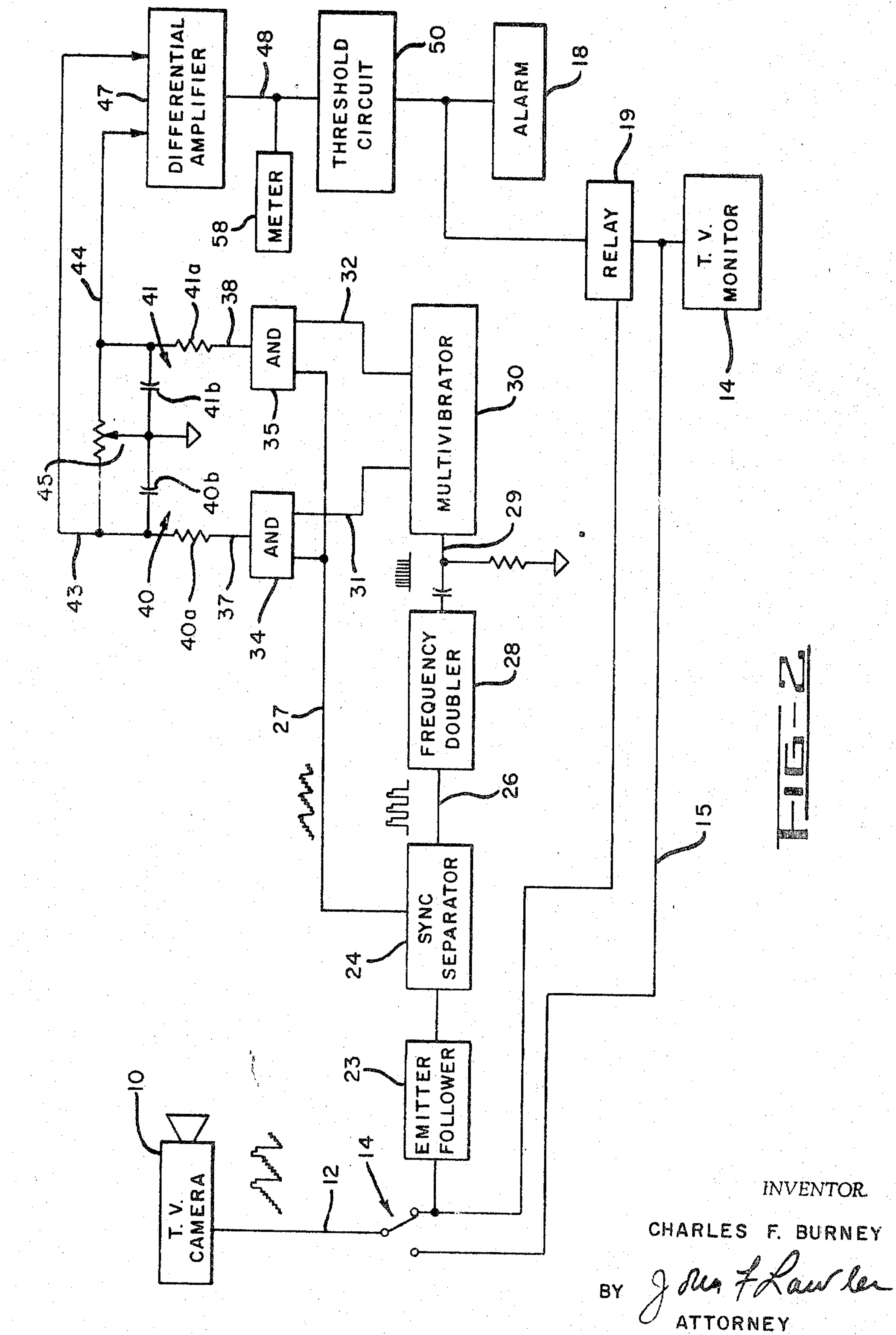
FIGURE 2 is a more detailed block diagram of the circuits embodying this invention.

Process circuit 17 comprises an emitter follower 23, see FIGURE 2, and a synchronization separation circuit 24 which, as its title implies, separates the horizontal synchronization pulses from the video signal in the camera output. Separator circuit 24 may comprise a base clipper biased slightly above the amplitude of the video signal, see line B—B in FIGURE 3(*a*), so as to pass only the synchronization pulses to line 26 [FIGURE 3(*b*)], and a peak limiter similarly biased to pass only the video signals to line 27 [FIGURE 3(*c*)]. The frequency of the pulses on line 26 is doubled by a frequency doubler 28, the output of which on line 29 [FIGURE 3(*d*)] is applied as an input to a bistable multivibrator 30 to produce on output lines 31 and 32 thereof alternating gating pulses, see FIGURE 3(*e*) and (*f*). These gating pulses are derived from the opposite halves of multivibrator 30 and the width of each pulse is equal to one-half of the horizontal sweep-period of the camera tube. Thus, if the frequency of the horizontal cynchronization signals is 15,750 Hz., the sweep period is 63.5 microseconds and the pulses on lines 31 and 32 are each 31.75 microseconds wide. Pulses having the same sense, say positive pulses, are generated alternately and back-to-back.

Lines 31 and 32 are connected respectively to AND gates 34 and 35 for supplying one of two inputs to each, the other input to each AND gate being derived from line 27 carrying the video signal. Thus, AND gates 34 and 35 are effective for alternate halves of the horizontal sweep period to pass video signals from line 27 to gate output lines 37 and 38, respectively, see FIGURE 3(*g*) and 3(*h*). In other words, gate 34 is "on" during the first half of the horizontal sweep across the camera tube and is "off" during the other half of the sweep, so that only those video signals which occur or appear in that one-half of the field of view of the camera tube pass through that gate. Conversely, gate 35 is "on" only during the other half of the horizontal sweep and so passes video signals derived from the corresponding half of the scene picked up on the camera tube.

The outputs of the AND gates 34 and 35 are applied to integrating circuits 40 and 41, respectively, comprising resistors 40*a*, 41*a* and capacitors 40*b*, 41*b*. The voltages developed across capacitors 40*b* and 41*b* may represent the cumulative video voltages or fraction thereof for the left and right halves, respectively, of the camera tube for each field of the frame in interlaced scanning. The capacitors are discharged at the start of scanning of a field and the comparison of the outputs from the AND gates 34 and 35 occurs once for each scanning of the image by the camera tube beam.

The outputs of the two integrating circuits are taken on lines 43 and 44 across balancing potentiometer 45 which is adjusted under quiescent or "no alarm" conditions to equalize the voltages on lines 43 and 44. A differential amplifier 47 receives the inputs from lines 43 and 44 and produces an output on line 48 whenever a difference exists between these inputs. If the voltages on lines 43 and 44 are equal, there is no output from amplifier 47. It should be noted that an equal change in voltage on lines 43 and 44 that may occur, for example, when lights illuminating the protected area A fluctuate, does not produce an output on line 48. An adjustable threshold circuit 50 to which line 48 is connected provides a means for controlling the sensitivity of the system through selection of a predetermined threshold level which must be exceeded before an alarm is generated. The output from threshold circuit 50 is simultaneously applied to alarm device 18 for generation of an alarm such as sounding a bell, and to relay 19 which when so energized connects the output from camera 10 directly to monitor 14.

It will be noted that control 13 may be made as a self-contained unit readily connectable to an existing closed circuit television system without modification of internal circuits thereof. In its simplest form, unit 13 is removably connected by conventional pluggable connectors 55 and 56 in series with line 12, preferably at monitor 11. Thus, substantially no modification of the existing system is required in order to adapt it for use in accordance with the invention.

If the camera 10 is moved to a different position or is focused on another area to be protected, the image on the pickup tube is changed which, in most instances, will upset the "no alarm" balance or equality of voltages on input lines 43 and 44 to the differential amplifier. The system is quickly restored to a properly balanced state, however, by simple readjustment of potentiometer 45 until the output from the amplifier 47 is zero. A meter 58 is connected to line 48 to facilitate this resetting of the system.

In the preferred embodiment of the invention described above, a comparison of the total video signals in the left and right halves of the image on the camera pickup tube was described. However, it is entirely feasible and within the precepts of this invention that smaller fractions of the pickup tube image be so compared in order to detect changes that occur in the area of interest. For example, the pickup tube may be electronically divided into four, six, or more parts and comparison made between corresponding parts to determine whether change has occurred in one with respect to the other. This may be extended, if desired, to a comparison of electronically divided parts of a single line of the horizontal sweep on the pickup tube.

I claim:

1. For use in a closed circuit television system having a camera and pickup tube with a field of view including an area under surveillance and connectable to a remote monitor having a display screen by a line carrying video and horizontal scan synchronization signals from the camera for displaying the image of said area on said screen, a control unit connectable in said line comprising means for comparing the video signals transmitted by the camera during equal time increments of different parts of a sweep of the horizontal scan across the pickup tube and producing an output when a relative change in said compared video signals occurs, and means responsive to said output of said comparing means for electrically connecting said line to the monitor whereby the image of the protected area appears on the monitor screen when the compared video signals change relative to each other.

2. The control unit according to claim 1 with switch means in said line operative to connect the output of the camera directly to the monitor and to bypass said comparing means and connecting means.

3. For use in a closed circuit television system having a camera and pickup tube with a field of view including an area under surveillance and connectable to a remote monitor having a display screen by a line carrying video and horizontal scan synchronization signals from the camera for displaying the image of said area on said screen, a control unit connectable in said line comprising means for comparing the video signals transmitted by the camera during equal time increments of different parts of a sweep of the horizontal scan across the pickup tube and producing an output when a relative change in said compared video signals occurs, said comparing means comprising at least two gate circuits having inputs connected to said line and having outputs, each gate circuit having connect and disconnect operating states in which the input thereto is electrically connected to and disconnected from, respectively, the output thereof, and means for energizing said gate circuits simultaneously to change successively their operating states and so that at any one time one is in the connect state when the other is in the disconnect state, and means responsive to said output of said comparing means for electrically connecting said line to the monitor whereby the image of the protected area appears on the monitor screen when the compared video signals change relative to each other.

4. The control unit according to claim 3 in which said gate circuit energizing means is responsive to said horizontal synchronization signals for causing each gate circuit to change operating states at least once during each horizontal sweep across the pickup tube.

5. The control unit according to claim 3 with adjustable means for deriving equal signals from the outputs of said gate circuits whereby to define a quiescent condition of the system, a differential amplifier receiving said equal signals and operative to identify the equality and inequality thereof, and an adjustable threshold circuit responsive to the output of said differential amplifier.

6. The control unit according to claim 3 in which said gate energizing means comprises frequency multiplying means responsive to the horizontal synchronization signals for producing an output having a frequency which is an even multiple of the frequency of said synchronization signals, and gate actuating means adapted to produce a binary output and responsive to the output of said frequency multiplying means for changing the sense of said binary output at the frequency of said multiplying means output.

7. The control unit according to claim 6 in which the frequency of the output of said multiplying means is twice that of said synchronization signals.

References Cited

UNITED STATES PATENTS

| | | | |
|---|---|---|---|
| 2,561,197 | 7/1951 | Goldsmith | 178—6.8 |
| 3,049,588 | 8/1962 | Barnett | 178—6 |
| 3,191,048 | 6/1965 | Cowen | 340—228 X |
| 3,278,924 | 10/1966 | Archer | 340—258 |
| 3,281,817 | 10/1966 | Archer | 340—258 |
| 3,336,585 | 8/1967 | Macovski | 178—6 X |
| 3,339,194 | 8/1967 | Archer | 340—258 |

RICHARD MURRAY, Primary Examiner

RICHARD K. ECKERT, Jr., Assistant Examiner

U.S. Cl. X.R.

340—276